(12) United States Patent
Borowski et al.

(10) Patent No.: US 10,690,012 B2
(45) Date of Patent: Jun. 23, 2020

(54) METHOD FOR COUPLING A STEAM TURBINE AND A GAS TURBINE AT A DESIRED DIFFERENTIAL ANGLE USING A SETPOINT ACCELERATION

(71) Applicant: Siemens Aktiengesellschaft, Munich (DE)

(72) Inventors: Marc Borowski, Moers (DE); Gerta Zimmer, Mulheim an der Ruhr (DE)

(73) Assignee: Siemens Aktiengesellschaft, Munich (DE)

( * ) Notice: Subject to any disclaimer, the term of this patent is extended or adjusted under 35 U.S.C. 154(b) by 33 days.

(21) Appl. No.: 16/099,858

(22) PCT Filed: Apr. 20, 2017

(86) PCT No.: PCT/EP2017/059405
§ 371 (c)(1),
(2) Date: Nov. 8, 2018

(87) PCT Pub. No.: WO2017/198415
PCT Pub. Date: Nov. 23, 2017

(65) Prior Publication Data
US 2019/0136720 A1   May 9, 2019

(30) Foreign Application Priority Data
May 18, 2016 (EP) .................................. 16170145

(51) Int. Cl.
*F16D 23/10* (2006.01)
*F01K 23/16* (2006.01)

(52) U.S. Cl.
CPC .............. *F01K 23/16* (2013.01); *F16D 23/10* (2013.01); *F16D 2500/10462* (2013.01); *F16D 2500/3021* (2013.01)

(58) Field of Classification Search
None
See application file for complete search history.

(56) References Cited

U.S. PATENT DOCUMENTS 3,915,271 A * 10/1975 Harper ................... B63H 23/18
477/5
4,817,470 A * 4/1989 Muller ...................... F16H 3/12
477/110

(Continued)

FOREIGN PATENT DOCUMENTS

EP     1911939 A1    4/2008
EP     2813675 A1   12/2014

(Continued)

OTHER PUBLICATIONS

EP search report dated Oct. 31, 2016, for corresponding EP patent application No. 16170145.3.

(Continued)

*Primary Examiner* — Dirk Wright
(74) *Attorney, Agent, or Firm* — Beusse Wolter Sanks & Maire

(57) ABSTRACT

A method for coupling a rotating device, in particular a steam turbine, and a shaft device, in particular a gas turbine, having the following steps: detecting a differential angle between the shaft device and the rotating device; detecting a differential speed between the shaft device and the rotating device; predicting a coupling angle at which the rotating device and the shaft device would be coupled if the rotating device were accelerated with a known acceleration up to the start of the coupling-in; comparing the predicted coupling angle with a target coupling angle, and calculating therefrom a setpoint acceleration such that the predicted coupling angle matches the target coupling angle.

15 Claims, 2 Drawing Sheets

(56) References Cited

U.S. PATENT DOCUMENTS

| | | | | |
|---|---|---|---|---|
| 5,109,969 | A * | 5/1992 | Blaser | B41F 13/0008 192/103 R |
| 7,013,632 | B2 * | 3/2006 | Takai | F01K 23/101 60/39.182 |
| 8,137,240 | B2 * | 3/2012 | Humer | F01K 23/101 477/107 |
| 8,321,176 | B2 * | 11/2012 | Hempl | G01D 5/244 702/151 |
| 9,752,509 | B2 * | 9/2017 | Clayton | F02C 7/36 |
| 10,309,261 | B2 * | 6/2019 | Zimmer | F16D 48/00 |
| 10,480,405 | B2 * | 11/2019 | Winkel | F02C 7/36 |
| 2009/0325765 | A1 | 12/2009 | Humer et al. | |
| 2015/0059347 | A1 | 3/2015 | Clayton et al. | |
| 2016/0130983 | A1 | 5/2016 | Zimmer | |
| 2017/0175590 | A1 * | 6/2017 | Bennauer | F16D 48/06 |
| 2017/0237263 | A1 | 8/2017 | Heue et al. | |
| 2018/0106302 | A1 * | 4/2018 | Campbell | F16D 11/10 |
| 2019/0113085 | A1 * | 4/2019 | Veltmann | F16D 23/10 |

FOREIGN PATENT DOCUMENTS

| | | | |
|---|---|---|---|
| EP | 2910742 | A1 | 8/2015 |
| EP | 3012420 | A1 | 4/2016 |
| WO | 2014198649 | A1 | 12/2014 |
| WO | 2015124332 | A1 | 8/2015 |
| WO | WO-2017184067 | A1 * | 10/2017 ............. F16D 11/14 |

OTHER PUBLICATIONS

International search report and written opinion dated Jun. 16, 2017, for PCT/EP2017/059405.

* cited by examiner

METHOD FOR COUPLING A STEAM TURBINE AND A GAS TURBINE AT A DESIRED DIFFERENTIAL ANGLE USING A SETPOINT ACCELERATION

CROSS REFERENCE TO RELATED APPLICATIONS

This application is the US National Stage of International Application No. PCT/EP2017/059405 filed Apr. 20, 2017, and claims the benefit thereof. The International Application claims the benefit of European Application No. EP16170145 filed May 18, 2016. All of the applications are incorporated by reference herein in their entirety.

FIELD OF INVENTION

The invention relates to a method for coupling a steam turbine and a gas turbine at a desired differential angle using a setpoint acceleration.

BACKGROUND OF INVENTION

In combined gas and steam power plants, the gas turbine is firstly driven by the combustion of gas. Steam for a steam turbine is generated with the waste heat of the gas turbine. When the gas and steam power plant is started up, the gas turbine is therefore operated first. The steam turbine cannot be activated until sufficient steam is made available. In the case of single-shaft systems the gas turbine and generator are permanently connected to a shaft. The steam turbine is arranged on the same axis and can be connected via a clutch. It is therefore necessary to couple the steam turbine and gas turbine.

In practice, the coupling angle arises randomly here. EP 1 911 939 A1 discloses selecting the coupling angle in a targeted fashion. In this way it is possible to select a coupling angle at which the vibration loading is minimized. Roughly speaking, it is therefore possible to compensate unbalances of the two turbines to a certain extent. Particularly in comparison with a clutch in which both turbines are coupled in such a way that unbalances add together it is therefore possible to achieve a reduction in the vibration loading. Despite this advantage this method is not used.

A method for the targeted acceleration of the steam turbine with an acceleration value which is derived from the setpoint rotational speed difference and which is formed as a function of the detected differential angle, the acceleration and of the desired target coupling angle, is known from EP 2 813 675 A1, also WO 2014/198649 A1.

WO2015/124332 A1 discloses a method for coupling a steam turbine and a gas turbine having the following steps: 1) Acceleration of the steam turbine up to an output rotational speed which is below the rotational speed of the gas turbine; 2) Detecting a differential angle between the gas turbine and steam turbine; 3) Accelerating the steam turbine with an acceleration value which is derived from the setpoint rotational speed difference and which is formed as a function of the detected differential angle, of the acceleration and of a desired target coupling angle.

US 2015/059347 A1 discloses a method for coupling two shafts, in particular a gas turbine and a steam turbine. The rotational speed and rotational angle of the first shaft are detected, and the second shaft is controlled by adjusting a rotational speed of the second shaft relative to that of the first shaft. In this context, the acceleration of the second shaft is controlled in such a way that marks on the second shaft are at a predefined angle with respect to the marks on the first shaft as soon as the second shaft is adjusted to the predefined rotational speed. At a speed which is just below the synchronization speed, the method waits until the relative angle matches. The second shaft is then accelerated quickly and briefly and coupled to the first shaft.

SUMMARY OF INVENTION

An object of the invention is to make available an alternative method for coupling at a desired coupling angle. A corresponding arrangement is also to be developed.

Although the invention presented below is basically suitable for coupling a wide variety of rotating devices to a wide variety of shaft devices, in the interest of a figurative illustration a steam turbine is always selected as an example of a rotating device and a gas turbine as an example of a shaft device. This is the application of the invention which is the most important from the present point of view. Further applications are, however, expressly conceivable. For example, various part-turbines can be coupled. This is necessary in systems in which part of the turbine is not operated when there is a low load and is activated only when there is an increased power request.

It has been realized that a method for coupling a steam turbine and a gas turbine having the following steps should be made available: Detecting a differential angle between the gas turbine and steam turbine; Detecting a rotational speed difference between the gas turbine and steam turbine; Predicting a coupling angle at which the steam turbine and gas turbine would be coupled if the steam turbine were accelerated with a known acceleration up to the start of the coupling process; Comparing the predicted coupling angle with a target coupling angle and calculating therefrom a setpoint acceleration in such a way that the predicted coupling angle corresponds to the target coupling angle.

It is sufficient in technical measuring terms to detect the differential angle and differential speed between the gas turbine and steam turbine. The prediction of the coupling angle which would arise can be carried out computationally.

By means of the comparison of the predicted coupling angle with the target coupling angle it is easily possible to calculate a setpoint acceleration in such a way that the predicted coupling angle corresponds to the target coupling angle.

It is to be noted that the known acceleration which is used for the prediction does not have to be a measured value. It is therefore not necessary to measure the acceleration of the steam turbine.

In one embodiment, the prediction is based on the assumption that the start of the coupling process takes place as soon as the rotational speed of the rotating device reaches the rotational speed of the shaft device or exceeds it by a selected value. Therefore, the ratios in the case of a self-synchronizing clutch can be represented. Such clutches are mechanically constructed in such a way that as soon as the rotational speed of the steam turbine is slightly higher than the rotational speed of the gas turbine the coupling process takes place. Therefore, if a self-synchronizing clutch is used, the coupling process starts automatically at a specific, very low rotational speed difference. It is therefore favorable to assume just this for the prediction.

In one embodiment, the calculated setpoint acceleration serves as a value for the known acceleration. As already mentioned, it is not necessary to measure the known acceleration. As a general rule, very good results can be achieved if the value which is calculated as a setpoint acceleration is selected for the known acceleration.

In one embodiment, the steam turbine is accelerated up to an output rotational speed which is advantageously below the rotational speed of the gas turbine, with a selected acceleration independently of the aimed-at target coupling angle. The acceleration can therefore easily be achieved up until that point without having to change anything in respect of the method which is customary in the prior art.

In one embodiment, the selected acceleration is constant. It is often appropriate to accelerate largely constantly up to the output rotational speed.

In one embodiment, the prediction of the coupling angle is started when the output rotational speed is reached with the selected acceleration. As stated, it is not necessary to detect in terms of measuring technology the known acceleration which is used to predict the coupling angle. Instead, the operation is often carried out with the calculated setpoint acceleration. However, at the start of the prediction, there is not yet a value present for this unless this value has been set. Insofar as, as in the above embodiments, the steam turbine is accelerated with the selected acceleration—often a constant acceleration—at the start of the prediction of the coupling angle, it is appropriate that the selected acceleration serves as a known acceleration. It remains to be accepted that the selected acceleration is often a setpoint value and it is not ensured that the steam turbine is actually accelerated with the selected acceleration. However, the deviations are small enough for the method to function nevertheless.

In one embodiment, the output rotational speed is approximately 0.5 Hz up to approximately 1.5 Hz below the rotational speed of the shaft device, advantageously approximately 0.9 Hz to approximately 1.1 Hz. It has become apparent that with these values it is possible, on the one hand, to accelerate quickly up to the output rotational speed and, on the other hand, quick and targeted coupling with a desired differential angle is possible.

In one embodiment, during the calculation of the setpoint acceleration it is noted that during the coupling process the differential angle is changed by a coupling rotational angle. The coupling rotational angle arises during the coupling process for mechanical reasons which are not explored in more detail here. It is sufficient here to know that the coupling rotational angle occurs and depends on the respective coupling. Moreover, the coupling rotational angle is constant and can therefore be taken into account without difficulty during the calculation.

In one embodiment, the setpoint acceleration is converted into a setpoint rotational speed which is transferred to a turbine control unit. The setpoint rotational speed is obtained through suitable integration of the setpoint acceleration.

At this point, brief details will be given on the turbine control unit. The turbine control unit controls the speed of the turbine by means of the position of a valve which sets the supply of steam to the steam turbine. The widespread turbine control units require a setpoint rotational speed as the input signal. The turbine control unit ensures, in dependence thereon, on acceleration of the turbine. Therefore, the setpoint acceleration is brought about, as desired, by the transfer of the setpoint rotational speed. The way, if you like the roundabout way, of initially determining a setpoint rotational speed from the setpoint acceleration depends exclusively on the ability to use customary turbine control units.

The invention also relates to a corresponding arrangement. In one embodiment, the arrangement is designed to carry out the method described above. In order to avoid repetitions, reference is made, with respect to the arrangement, to the above statements relating to the method. In general, it is sufficient to adapt the programming correspondingly.

In one embodiment of the arrangement, the detection of the differential angle can be determined with a clock rate of approximately 4 ms to approximately 20 ms or lower. This involves a modification of known arrangements which is very helpful for carrying out the method described above. The differential angle can therefore be determined better.

BRIEF DESCRIPTION OF THE DRAWINGS

The invention will be explained in more detail below on the basis of an exemplary embodiment and using figures, of which.

DETAILED DESCRIPTION OF INVENTION

Figure 1:
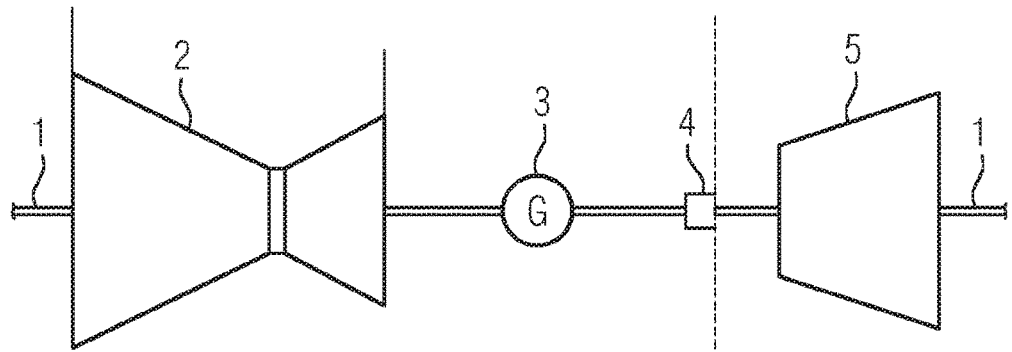
FIG. 1 shows a single-shaft system of a gas and steam power plant.

FIG. 1 shows the essential components, for the present invention, of a combined gas and steam power plant. The shaft 1 is to be considered an essential feature. A gas turbine 2 is attached to said shaft 1 and rotates therewith. In addition, a generator 3 which is driven by the gas turbine 2 can be seen.

The shaft 1 is interrupted by a clutch 4. The clutch 4 is embodied as a self-synchronizing clutch.

The steam turbine 5 is located in the part of the shaft 1 which adjoins the clutch 4. The clutch 3 therefore has the function of coupling the steam turbine 5 to the gas turbine 2. It is clear here that this is basically a clutch of the respective shaft parts of the shaft 1. However, since said shaft parts are fixedly connected to the gas turbine or the steam turbine, it is both factually correct, and backed up by a figurative illustration, for mention to be made of a coupling of the steam turbine 5 to the gas turbine 2.

Figure 2:
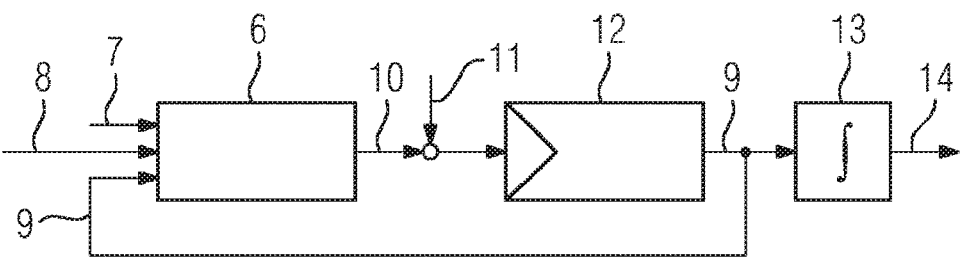
FIG. 2 shows the sequence of the prediction of the coupling angle and the control of the setpoint acceleration.

FIG. 2 shows the profile of the prediction of the coupling angle and the control of the setpoint acceleration. A detected differential angle 7 between the gas turbine 2 and the steam turbine 5 and a detected differential speed 8 between the gas turbine 2 and steam turbine 5 are included in a prediction module 6. In addition, the setpoint acceleration 9 is included, and this will be returned to below.

In the prediction module 6 a coupling angle 10 is determined from the differential angle 7, the differential speed 8 and the setpoint acceleration 9, which coupling angle 10 would be obtained if the steam turbine 5 were accelerated with the setpoint acceleration 9 until the clutch 4 starts the coupling process. It is to be noted that owing to its design as a self-synchronizing clutch, owing to the design the clutch 4 starts the coupling process as soon as the rotational speed of the steam turbine 5 slightly exceeds the rotational speed of the gas turbine 2.

The predicted coupling angle 10 which results from the prediction is compared with a predefined target coupling angle 11. The setpoint acceleration 9 is determined in the acceleration module 12 from the difference between the predicted coupling angle 10 and the target coupling angle 11. As already mentioned, this setpoint acceleration 9 is transferred to the prediction module 6. Moreover, the setpoint acceleration 9 is transferred to an integrator 13. A setpoint rotational speed 14 of the steam turbine is determined in the integrator 13 from the setpoint acceleration 9 by integration of the setpoint acceleration 9 over time up to the start of the coupling process.

Figure 3:
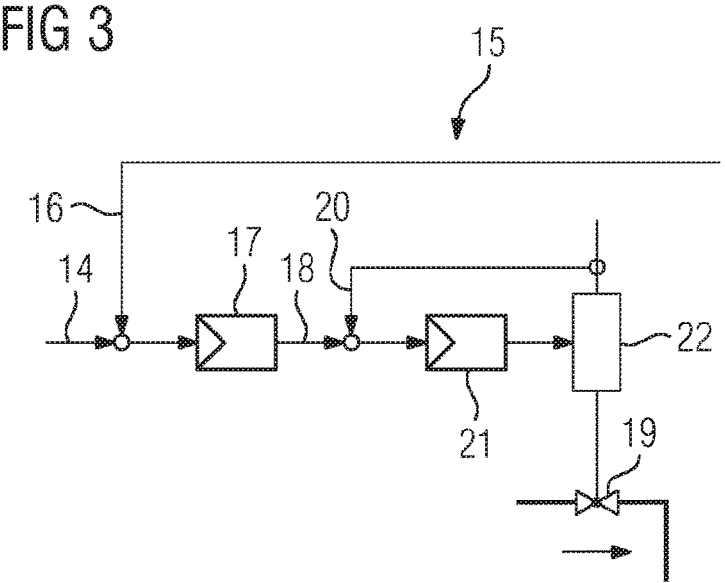
FIG. 3 shows the control of the setpoint acceleration and the interaction of the turbine control unit.

The setpoint rotational speed 14 is, as is apparent in FIG. 3, transferred to a turbine control unit 15. Such turbine control units are known from the prior art. For reasons of completeness, a brief presentation of the turbine control unit 15 will nevertheless be given. The turbine control unit can receive the setpoint rotational speed 14 and compare it with a measured steam turbine rotational speed 16. A setpoint position 18 of a steam turbine valve 19 is determined in the speed module 17 from the comparison of the setpoint rotational speed 14 with the steam turbine rotational speed 16.

The setpoint position 18 is compared with the detected steam turbine valve position 20. On the basis of this, a position module 21 determines how an adjustment unit 22 sets the steam turbine valve 19.

The presentation above makes it clear that the new coupling method using a setpoint acceleration can easily be integrated into existing control concepts.

The illustration is to be considered an abstract illustration of the steps. The prediction that one step takes place in a module and a further step takes place in another module does not mean that the modules necessarily have to be different components. It is therefore possible to carry out a lot on a common computer unit. What is significant is rather the logical sequencing of the steps.

Figure 4:
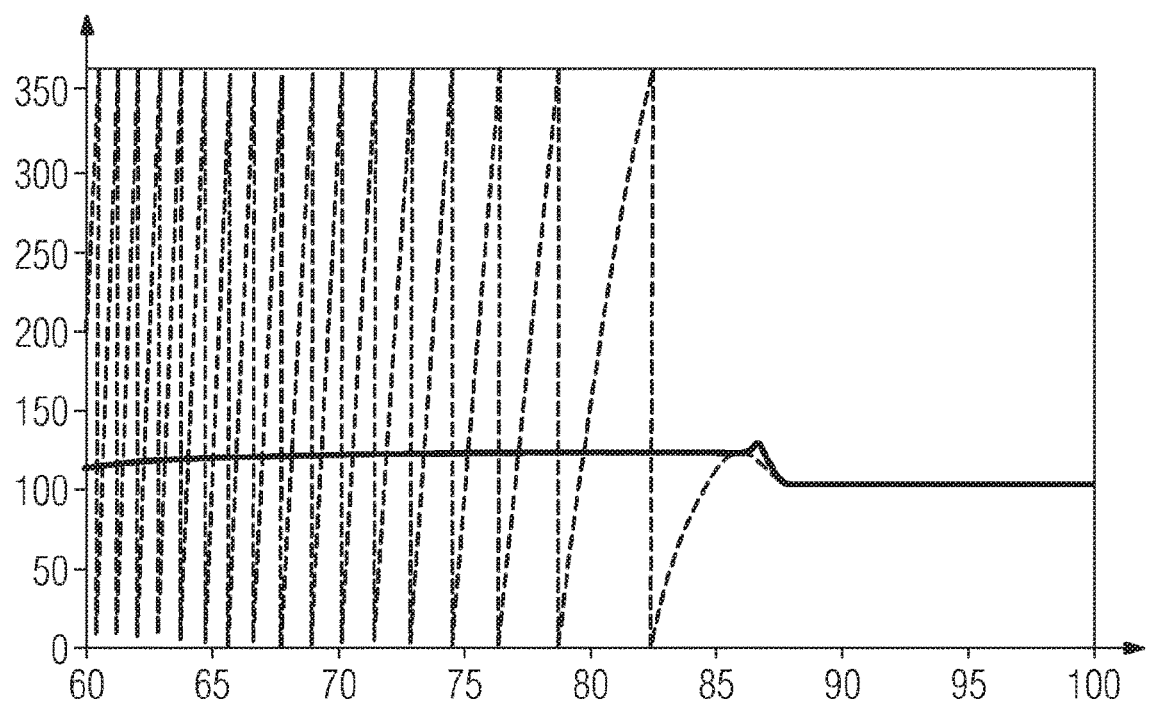
FIG. 4 shows a simulation of the measured differential angle and of the predicted coupling angle.

FIG. 4 illustrates the time profile of the detected differential angle and the predicted coupling angle. The time is plotted in seconds on the horizontal axis, and the angle in degrees on the vertical axis. The profile of the detected differential angle is shown by the dashed line, and the predicted coupling angle is shown by the continuous line.

Figure 5:
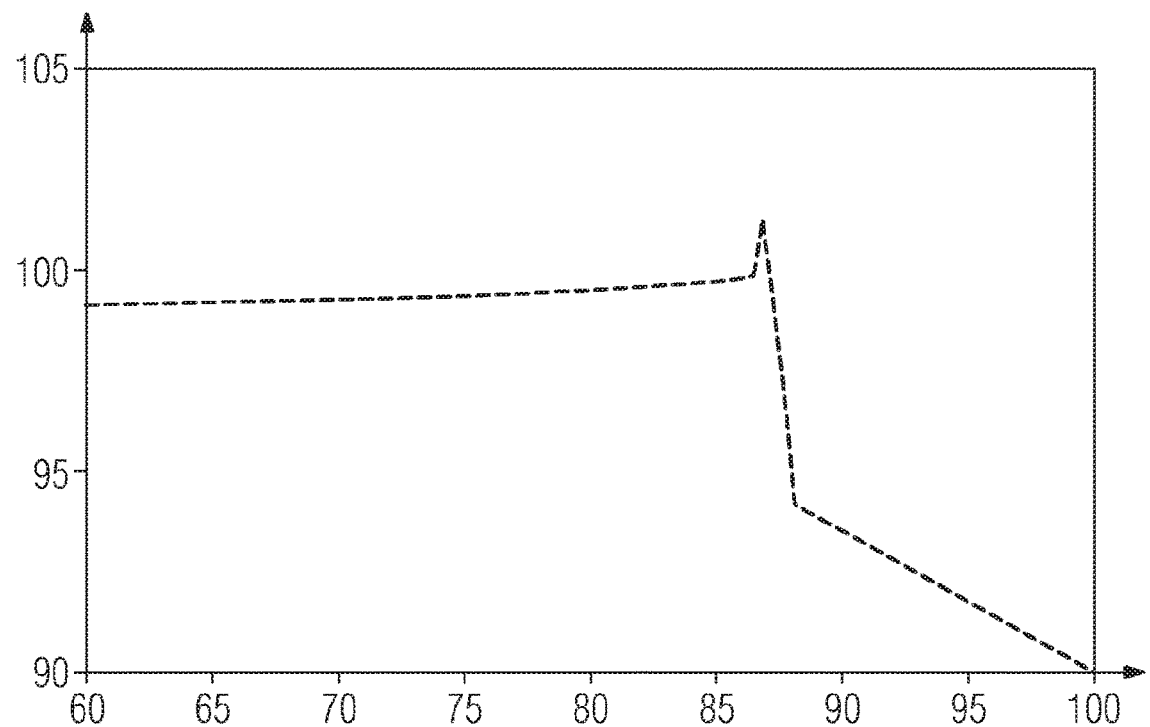
FIG. 5 shows a simulation of the controlled acceleration.

In FIG. 5, a simulation of the controlled acceleration is plotted against the time. The time is plotted in seconds on the horizontal axis. The acceleration is plotted in percentage up to a random acceleration value on the vertical axis. The severe drop between 85 s and 90 s is due to the coupling process. The rest of the profile of the curve is no longer significant. After the coupling process, the steam turbine 5 and gas turbine 2 are naturally at the same speed.

Although the invention has been illustrated and described in more detail by means of the preferred exemplary embodiment, the invention is not limited by the disclosed examples and other variations can be derived therefrom by a person skilled in the art without departing from the scope of protection of the invention.

The invention claimed is:

1. A method for coupling a rotating device and a shaft device, comprising:
   detecting a differential angle between the shaft device and rotational device;
   detecting a differential speed between the shaft device and rotational device;
   predicting a coupling angle at which the rotational device and shaft device would be coupled if the rotational device were accelerated with a known acceleration up to a start of a coupling process;
   comparing the predicted coupling angle with a target coupling angle and calculating therefrom a setpoint acceleration in such a way that the predicted coupling angle corresponds to the target coupling angle.

2. The method as claimed in claim 1,
   wherein the prediction is based on an assumption that the start of the coupling process takes place as soon as the rotational speed of the rotating device reaches the rotational speed of the shaft device or exceeds it by a selected value.

3. The method as claimed in claim 1,
   wherein the calculated setpoint acceleration serves as a value for the known acceleration.

4. The method as claimed in claim 1,
   wherein the rotational device is accelerated up to an output rotational speed which is below the rotational speed of the shaft device, with a selected acceleration independently of an aimed-at target coupling angle.

5. The method as claimed in claim 4,
   wherein the selected acceleration is constant.

6. The method as claimed in claim 3,
   wherein the prediction of the coupling angle is started when an output rotational speed is reached with a selected acceleration.

7. The method as claimed in claim 3,
   wherein an output rotational speed is approximately 0.5 Hz up to approximately 1.5 Hz below the rotational speed of the shaft device.

8. The method as claimed in claim 1,
   wherein during the calculation of the setpoint acceleration it is noted that during the coupling process the differential angle is changed by a coupling rotational angle.

9. The method as claimed in claim 1,
   wherein the setpoint acceleration is converted into a setpoint rotational speed which is transferred to a turbine control unit.

10. An arrangement having a shaft device and a rotating device, having a clutch for coupling the shaft device and rotating device, comprising:
    a device for detecting a differential angle between the shaft device and rotating device;
    a device for detecting a differential speed between the shaft device and rotating device;
    a device for accelerating the rotating device with an acceleration value;
    a prediction module that predicts, from the detected differential angle, the detected differential speed and a known acceleration, a coupling angle which would occur if the rotating device were accelerated with the known acceleration up to a start of the coupling; and
    an acceleration module which compares the predicted coupling angle with a target coupling angle and calculates therefrom a setpoint acceleration such that the predicted coupling angle corresponds to the target coupling angle are present.

11. An arrangement comprising:
    a shaft device, a rotating device, and a clutch for coupling the shaft device to the rotating device; and
    a control unit designed to carry out a method as claimed in claim 1.

12. The arrangement as claimed in claim 10,
    wherein the detection of the differential angle is determined with a clock rate of approximately 4 ms up to approximately 20 ms or lower.

13. The method as claimed in claim 7,
    wherein the output rotational speed is approximately 0.9 Hz up to approximately 1.1 Hz below the rotational speed of the shaft device.

14. The method as claimed in claim 1,
wherein the rotating device is a steam turbine and wherein the shaft device is a gas turbine.

15. The arrangement as claimed in claim 10,
wherein the rotating device is a steam turbine and wherein the shaft device is a gas turbine.

\* \* \* \* \*